Figure 1:
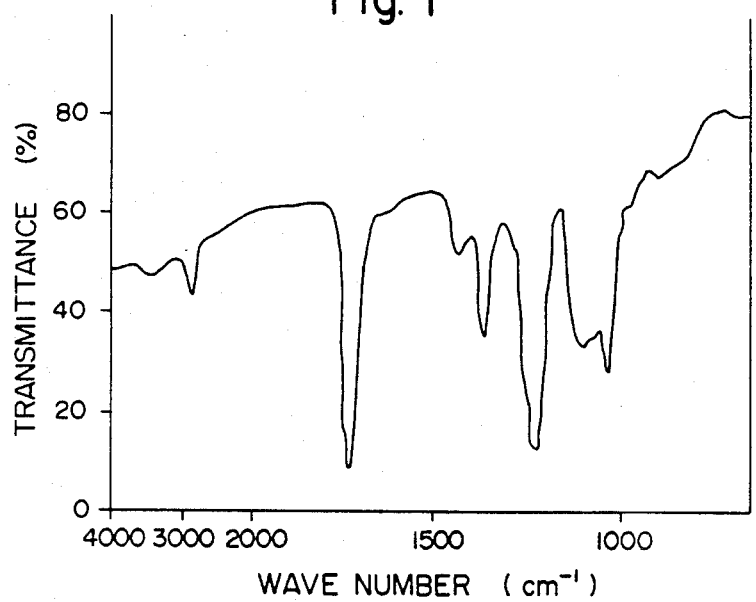

United States Patent [19]

Shimizu et al.

[11] Patent Number: 4,530,994
[45] Date of Patent: Jul. 23, 1985

[54] RUBBERY SOLID POLYMER OR COPOLYMER OF GLYCIDYL CARBOXYLATE AND COMPOSITION THEREOF

[75] Inventors: Yasumi Shimizu, Amagasaki; Tetsuya Nakata, Ibaraki, both of Japan

[73] Assignee: Osaka Suda Co Ltd, Osaka, Japan

[21] Appl. No.: 626,027

[22] Filed: Jun. 29, 1984

[30] Foreign Application Priority Data

Jun. 30, 1983 [JP] Japan ................ 58-119921
Jun. 30, 1983 [JP] Japan ................ 58-119922
Jun. 30, 1983 [JP] Japan ................ 58-119923
Dec. 7, 1983 [JP] Japan ................ 58-231765
Dec. 7, 1983 [JP] Japan ................ 58-231766

[51] Int. Cl.³ ........................... C08G 65/08
[52] U.S. Cl. ..................... 525/403; 525/409; 528/361
[58] Field of Search ............ 528/361; 525/403, 409

[56] References Cited

U.S. PATENT DOCUMENTS 3,158,591 11/1964 Vandenberg .......... 528/393 X
3,285,870 11/1966 Vandenberg .......... 528/361 X
3,773,694 11/1973 Nakata et al. .......... 528/361 X
4,009,128 2/1977 Vandenberg .......... 528/361 X Primary Examiner—Earl A. Nielsen
Attorney, Agent, or Firm—Sherman & Shalloway

[57] ABSTRACT

A rubbery solid polymer or copolymer of a carboxylic acid glycidyl ester having a repeating unit of formula (I), repeating units of formulae (I) and (II) in which the (I)/(II) mole ratio is 50-99/50-1, repeating units of formulae (I), (II) and (III) in which the (I)/(II)/(III) mole ratio is 1-90/1-10/3-40, repeating units of formulae (I), (II) and (IV) in which the (I)/(II)/(IV) mole ratio is 35-90/1-20/not less than 5, repeating units of formulae (I) and (III) in which the (I)/(III) mole ratio is 50-97/50-3, repeating units of formulae (I), (III) and (IV) in which the (I)/(III)/(IV) mole ratio is 35-90/5-60/not less than 5, or repeating units of formulae (I), (II), (III) and (IV) in which the (I)/(II)/(III)/(IV) mole ratio is 35-85/3-10/3-55/not less than 5

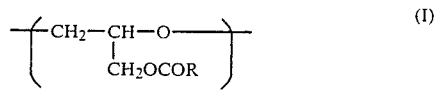

(I)

wherein R represents a saturated alkyl group having 1 to 4 carbon atoms,

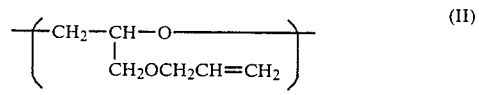 (II)

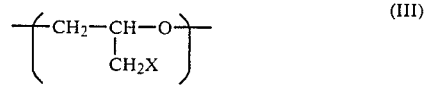

(III)

wherein X represents a halogen atom,

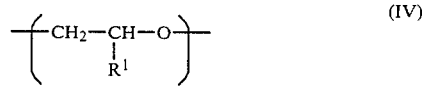 (IV)

wherein R¹ represents H or CH₃;
and a curable composition thereof.

10 Claims, 11 Drawing Figures

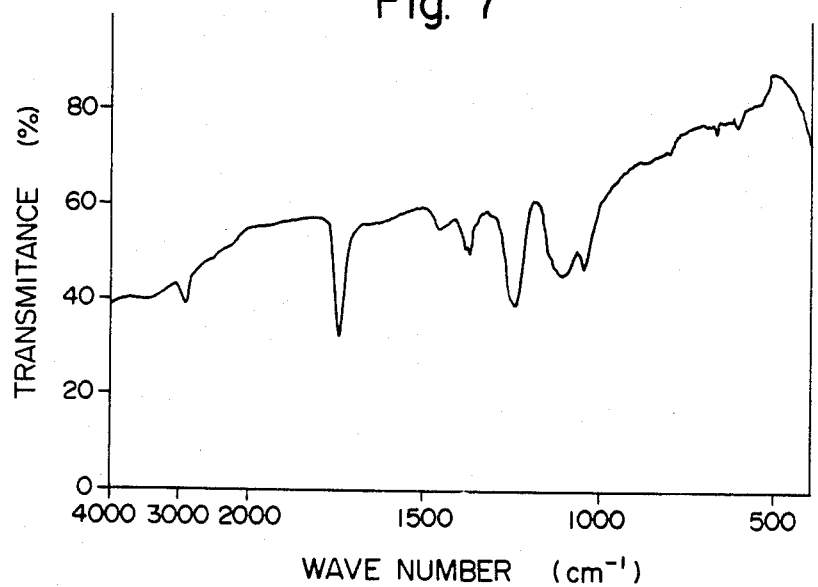
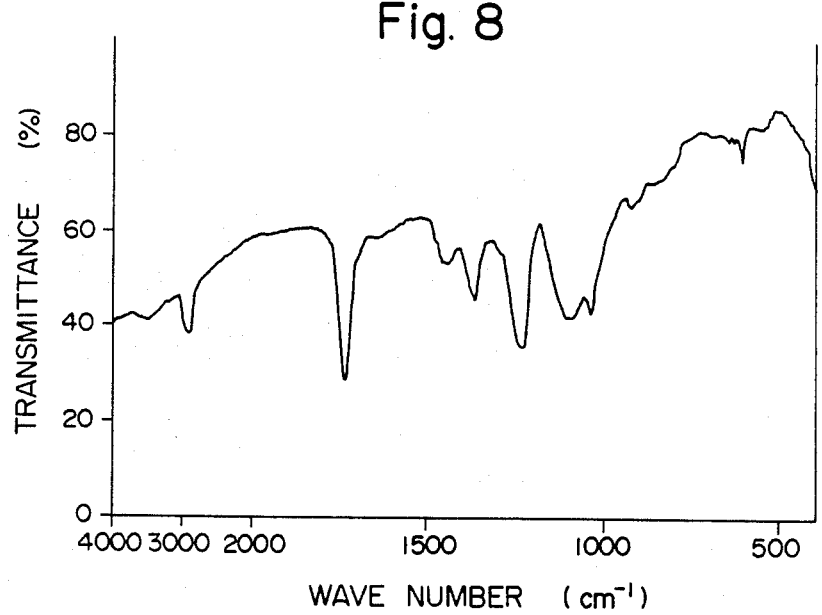

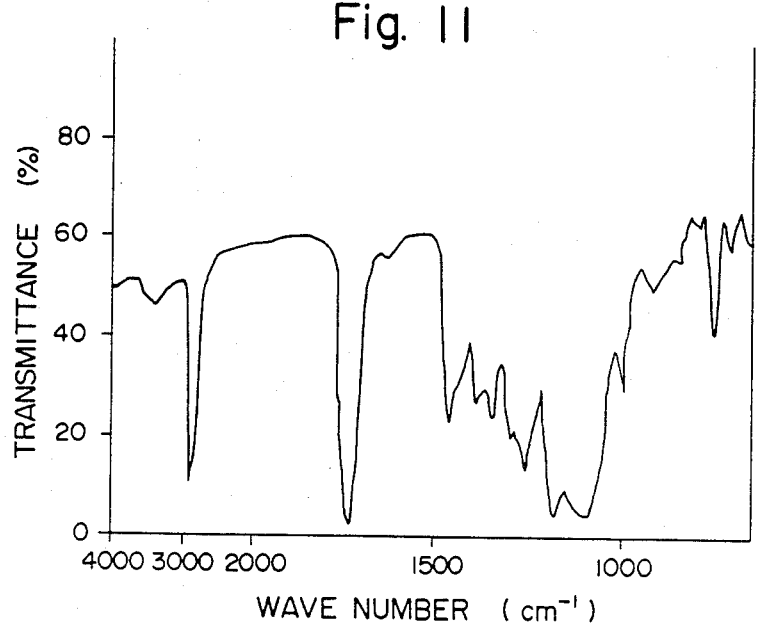

RUBBERY SOLID POLYMER OR COPOLYMER OF GLYCIDYL CARBOXYLATE AND COMPOSITION THEREOF

This invention relates to a rubbery solid polymer or copolymer of a carboxylic acid glycidyl ester not described in the known literature, and to a curable composition of the polymer or copolymer. Particularly, it relates to a novel rubbery solid polymer or copolymer of a carboxylic acid glycidyl ester capable of providing a cured rubbery composition or article having excellent oil resistance and cold resistance in a well-balanced combination, and to a curable composition of the polymer or copolymer.

More specifically, this invention relates to a rubbery solid polymer or copolymer of a carboxylic acid glycidyl ester, said polymer or copolymer having a reduced viscosity, determined at 80° C. for its 0.1% solution in monochlorobenzene, of at least 0.5, and the main chain of said polymer or copolymer consisting of a repeating unit of formula (I), repeating units of formulae (I) and (II) in which the (I)/(II) mole ratio is 50-99/50-1, repeating units of formulae (I), (II) and (III) in which the (I)/(II)/(III) mole ratio is 1-90/1-10/3-40, repeating units of formulae (I), (II) and (IV) in which the (I)/(II)/(IV) mole ratio is 35-90/1-20/not less than 5, repeating units of formulae (I) and (III) in which the (I)/(III) mole ratio is 50-97/50-3, repeating units of formulae (I), (III) and (IV) in which the (I)/(III)/(IV) mole ratio is 35-90/5-60/not less than 5, or repeating units of formulae (I), (II), (III) and (IV) in which the (I)/(II)/(III)/(IV) mole ratio is 35-85/3-10/3-55/not less than 5, provided that when the main chain has two or more repeating units, the total amount of the units is 100:

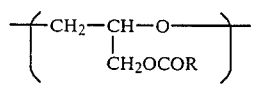
(I)

wherein R represents a saturated alkyl group having 1 to 4 carbon atoms,

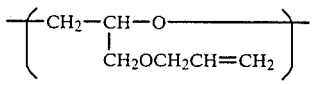
(II)

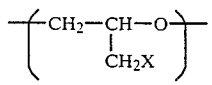
(III)

wherein X represents a halogen atom,

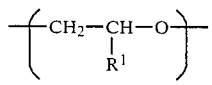
(IV)

wherein $R^1$ represents H or $CH_3$.

This invention also relates to a curable composition composed of the rubbery solid polymer or copolymer of a carboxylic acid glycidyl ester and a curing agent.

Many techniques have previously been disclosed about the ring-opening polymerization of three-membered cyclic epoxide compounds. It is generally known that a broad range of epoxide compounds can be polymerized by using organoaluminum compound-type catalysts or organotinphosphate ester compound-type catalysts. There are no reports in the literature, however, about the production of high-molecular-weight polymers from carboxylic acid glycidyl esters (glycidyl carboxylates) which are epoxide compound having an ester group.

For example, U.S. Pat. Nos. 3,135,706, 3,135,705, 3,219,591 and 3,280,045 describe the polymerization or copolymerization of epoxides using organoaluminum compound-type catalysts, but fail to give any specific example of producing high-molecular-weight polymers or copolymers of glycidyl carboxylates. By the use of the organoaluminum compound-type catalysts disclosed in these U.S. Patents, it is difficult to form a high-molecular-weight polymer or copolymer because of the reactivity of the ester group of the glycidyl carboxylates. These patent documents list a large number of compounds including the glycidyl carboxylates as examples of epoxides, but do not at all show specific examples of the production of polymers or copolymers of such epoxides.

J. Polymer Science, Vol. 13, 1993–2003 (1975) reported an attempt of obtaining poly(glycidyl acetate) by the substitution reaction of polyepichlorohydrin. In the formation of a polymer of a glycidyl carboxylate by such a substitution reaction, the molecular weight of the polymer tends to be reduced owing to the degradation of its main chain, and usually the substitution reaction does not sufficiently proceed. As a matter of fact, this literature reference reports only the formation of a copolymer having a relatively low molecular weight and containing about 2-3% of epichlorohydrin remaining there.

As an example of using a glycidyl carboxylate was a comonomer, the copolymerization of epichlorohydrin and a glycidyl methacrylate, an unsaturated carboxylic acid ester, in the presence of an organoaluminum compound-type catalyst is known (U.S. Pat. Nos. 3,158,591 and 3,285,870). By the use of the organoaluminum compound-type catalyst, however, it is difficult to form a high-molecular-weight polymer or copolymer of a glycidyl carboxylate as stated hereinabove. According to this prior technique, an attempt is made to introduce an unsaturated group as a crosslinking site into a polymer. However, the proportion of the glycidyl ester introduced into the resulting copolymer is extremely low, and the resulting copolymer has a low molecular weight. Furthermore, an attempt to increase the proportion of the glycidyl ester in this technique results in a further reduction in molecular weight.

A report is known which deals with the ring-opening polymerization of glycidyl acetate in the presence of a boron trifluoride-diethyl ether complex [Makromol. Chem., 71, 150 (1964)]. This polymerization, however, gave only an oily low-molecular-weight polymer.

Russian Pat. No. 229,806 discloses the copolymerization of ethylene oxide and glycidyl acetate in the presence of a Friedel-Crafts catalyst. The product, however, is a water-soluble copolymer having a very low molecular weight and a low glycidyl ester content.

U.S. Pat. No. 3,773,694 whose inventorship includes one of the present inventors discloses a method of polymerizing vicinal alkylene oxides and an organotin-phosphate ester-type catalyst useful in the aforesaid method. This U.S. Patent exemplifies various alkylene oxides including glycidyl carboxylates as examples of the vicinal alkylene oxides. However, it does not at all give specific examples of the polymerization or copolymerization of glycidyl carboxylates. Naturally, the U.S. Patent fails to teach anything about the properties of the resulting polymer or copolymer.

The present inventors have made investigations in order to provide a high-molecular-weight polymer or copolymer of a glycidyl carboxylate. Consequently, they succeeded in synthesizing rubbery solid polymers or copolymers of glycidyl carboxylates which are not described in the known literature and which have a reduced viscosity, determined at 80° C. for its 0.1% monochlorobenzene solution, of at least 0.5.

The investigations of the present inventors have shown that a high-molecular-weight rubbery solid polymer or copolymer of a carboxylic acid glycidyl ester whose main chain consists of the repeating unit of formula (I), the repeating units of formulae (I) and (II) in which the (I)/(II) mole ratio is 50-99/50-1, the repeating units of formulae (I), (II) and (III) in which the (I)/(II)/(III) mole ratio is 1-90/1-10/3-40, the repeating units of formulae (I), (II) and (IV) in which the (I)/(II)/(IV) mole ratio is 35-90/1-20/not less than 5, the repeating units of formulae (I) and (III) in which the (I)/(III) mole ratio is 50-97/50-3, the repeating units of formulae (I), (III) and (IV) in which the (I)/(III)/(IV) mole ratio is 35-90/5-60/not less than 5, or the repeating units of formulae (I), (II), (III) and (IV) in which the (I)/(II)/(III)/(IV) mole ratio is 35-85/3-10/3-55/not less than 5, provided that when the main chain has two or more repeating units, the total amount of the units is 100, can be synthesized by using the organotin-phosphate ester-type catalyst disclosed in the above-cited U.S. Pat. No. 3,773,694. It has been found that the resulting polymer or copolymer can give a cured rubbery composition having a well-balanced combination of excellent oil resistance and excellent cold resistance which have previously been unable to make compatible.

It is an object of this invention therefore to provide a novel high-molecular-weight rubbery solid polymer or copolymer of a carboxylic acid glycidyl ester.

Another object of this invention is to provide a curable composition composed of the aforesaid polymer or copolymer and a curing agent, and a cured composition obtained by curing the curable composition.

The above and other objects and advantages of this invention will become more apparent from the following description.

The unit of formula (I) is a unit derived by the ring-opening of a glycidyl carboxylate of the following formula (I)' as schematically shown below.

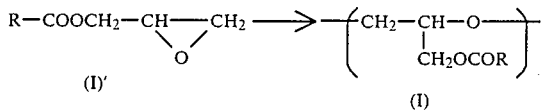

In the formula, R represents a saturated alkyl group having 1 to 4 carbon atoms.

Specific example of the compound of formula (I)' include glycidyl acetate, glycidyl propionate, glycidyl butyrate and glycidyl valerate. They may be used either singly or in combination.

The unit of formula (II) is a unit derived by the ring opening of an allyl glycidyl ether of formula (II)' as shematically shown below.

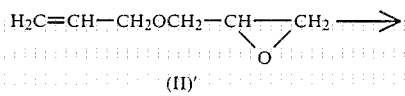

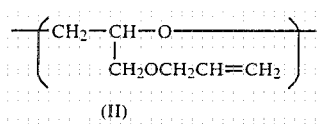

The unit of formula (III) is a unit derived by the ring opening of an epihalohydrin of formula (III)'.

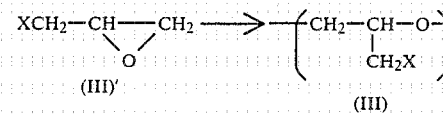

In the formulae, X represents a halogen atom such as Cl or Br.

Specific examples of the compound of formula (III)' are epichlorohydrin and epibromohydrin. They may be used singly or in combination.

The unit of formula (IV) is a unit derived by the ring opening of an alkylene oxide of formula (IV)'.

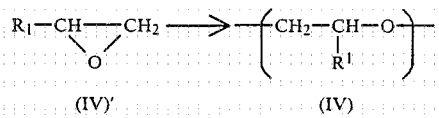

In the formulae, $R^1$ represents H or $CH_3$.

Specific examples of the compound of formula (IV)' are ethylene oxide and propylene oxide. They may be used either singly or in combination.

The high-molecular-weight rubbery solid polymer or copolymer of a carboxylic acid glycidyl ester in accordance with this invention has a main chain structure composed of a repeating unit of formula (I), repeating units of formulae (I) and (II) in which the (I)/(II) mole ratio is 50-99/50-1, repeating units of formulae (I), (II) and (III) in which the (I)/(II)/(III) mole ratio is 1-90/1-10/3-40, repeating units of formulae (I), (II) and (IV) in which the (I)/(II)/(IV) mole ratio is 35-90/1-20/not less than 5, repeating units of formulae (I) and (III) in which the (I)/(III) mole ratio is 50-97/50-3, repeating units of formulae (I), (III) and (IV) in which the (I)/(III)/(IV) mole ratio is 35-90/5-60/not less than 5, or repeating units of formulae (I), (II), (III) and (IV) in which the (I)/(II)/(III)/(IV) mole ratio is 35-85/3-10/3-55/not less than 5, provided that when the main chain has two or more repeating units, the total amount of the units is 100. The polymer or copolymer has a reduced viscosity, determined at 80° C. for its 0.1% monochlorobenzene solution, of at least 0.5.

If the proportion of the unit (II) is less than 1 mole% in a copolymer having a main chain structure composed of the units (I) and (II), the effect of improving the curability of the copolymer is not sufficient. If it exceeds 50 mole%, a deleterious effect is exerted on the oil resistance of the final cured product.

If the proportion of the unit (II) in a copolymer having a main chain structure composed of the units (I), (II) and (III) is outside the above-specified range, an adverse effect is exerted on heat resistance. If the proportion of the unit (III) is less than 3 mole%, the curability of the copolymer is reduced. If it exceeds 40 mole%, the halogen in the copolymer tends to cause a corrosion trouble.

If the proportion of unit (I) is less than 35 mole% in a copolymer having a main chain structure composed of the units (I), (II) and (IV), the oil resistance and heat resistance of the final cured product are reduced. If it exceeds 90 mole%, a deleterious effect is exerted on the cold resistance of the cured product. If the proportion of unit (II) is less than 1 mole%, the effect of improving the curability of the resulting or copolymer is not sufficient. If it exceeds 20 mole%, an adverse effect is exerted on the oil resistance and heat resistance of the cured product. If the proportion of the unit (IV) is less than 5 mole%, there is a reduction in cold resistance.

If the proportion of the unit (III) is less than 3 mole% in a copolymer having a main chain structure composed of the units (I) and (III), the curability of the copolymer is reduced. If it exceeds 50 mole%, an adverse effect is exerted on oil resistance. If the proportion of the unit (I) is less than 35 mole% in a copolymer having a main chain structure composed of the units (I), (III) and (IV), an adverse effect is exerted on oil resistance and heat resistance. If it exceeds 90 mole%, the cold resistance of the cured product is insufficient. If the proportion of the unit (III) is less than 5 mole%, the improvement of curability becomes insufficient. If it exceeds 60 mole%, the halogen in it tends to corrode the metallic parts of molding machines, and the oil resistance of the cured product by the unit (I) is sacrificed. If the proportion of the unit (IV) is less than 5 mole%, an adverse effect is exerted on cold resistance.

If the proportion of the unit (I) is less than 35 mole% in a copolymer having a main chain structure composed of the units (I), (II), (III) and (IV), the oil resistance and the heat resistance of the cured product are reduced. If it exceeds 85 mole%, an adverse effect is exerted on cold resistance. If the proportion of the unit (II) is too small or too large beyond the range of 3 to 10 mole%, the oxidation resistance of the cured product is adversely affected. If the proportion of the unit (III) is less than 3 mole%, the curability of the copolymer is reduced. If it exceeds 55 mole%, a corrosion trouble by halogen tends to occur, and an adverse effect is exerted on the oil resistance ascribed to the unit (I). If the proportion of the unit (IV) is less than 5 mole%, the cold resistance of the cured product is reduced.

The high-molecular-weight rubbery solid polymer or copolymer of a carboxylic acid glycidyl ester has a reduced viscosity, determined at 80° C. for its 0.1% monochlorobenzene solution, of at least 0.5, preferably at least 1.0. for example 1.0 to 4.0. The high-molecular-weight rubbery solid copolymer is a random copolymer.

The rubbery solid polymer or copolymer of a carboxylic acid glycidyl ester in accordance with this invention can be synthesized by using a catalyst selected from the known organotin-phosphate ester compound-type catalysts disclosed in the above-cited U.S. Pat. No. 3,773,694.

In particular, it can be produced by ring-opening polymerization or copolymerization of the monomers of formulae (I)' to (IV)' in the combinations and proportions (mole%) stated above with regard to the above polymer or copolymer units, in the presence of a heat-condensation reaction product of (A) an organotin compound and (B) an alkyl ester of ortho-phosphoric acid or polyphosphoric acid.

The catalyst components (A) and (B) are described in detail in the above-cited U.S. Pat. No. 3,773,694, and can be utilized in this invention. The catalyst composed of the heat-condensation reaction product of components (A) and (B) can be formed by heating the components (A) and (B) in a tin atom/phosphorus atom ratio of preferably from 1:10 to 10:1 at a temperature of, preferably, about 100° to about 300° C. As required, the reaction of components (A) and (B) may be carried out in the presence of a solvent. The conditions of the heat-condensation reaction, the solvent, etc. are described in detail in the above-cited U.S. Pat. No. 3,773,694 and can be properly selected and used in the formation of the catalyst for use in the production of the polymer or copolymer of this invention.

The rubbery solid polymer or copolymer of a carboxylic acid glycidyl ester in accordance with this invention can be produced by the ring-opening polymerization or copolymerization of one or more comonomers selected from the compounds of formulae (I)' to (IV)' in the combinations and proportions described with regard to the units (I) to (IV), in the presence of the aforesaid catalyst.

The reaction can be carried out in the presence or absence of solvent. Examples of the solvent include aliphatic hydrocarbons such as butane, pentane, hexane and heptane, aromatic hydrocarbons such as benzene and toluene, ethers such as diethyl ether and dibutyl ether and halogenated hydrocarbons such as dichloromethane and dichloroethane. The reaction can be carried out at a temperature of, for example, 0° to about 80° C. The amount of the catalyst used can be properly chosen, but is preferably about 0.01 to about 5 g per 100 g of the monomer or monomers. Desirably, the moisture content of the reaction system should be minimized during the reaction. It is preferred that the reaction can be carried out with stirring or shaking.

The high-molecular-weight rubbery solid polymer or copolymer of a carboxylic acid glycidyl ester in accordance with this invention is useful as an intermediate for imparting functionality by the reaction of the carboxyl group, a material for a film, a material for paint films and a reactive intermediate for the formation of a graft copolymer, and has particularly noteworthy properties as a rubbery material. It is well known that generally a rubbery material having improved oil resistance has inferior cold resistance, whereas a rubbery material having improved cold resistance has inferior oil resistance; and that usually, it is impossible in practice to provide a rubbery material having a well-balanced combination of oil resistance and cold resistance which are incompatible with each other. The high-molecular-weight solid rubbery polymer or copolymer of this invention is unique in that it is curable and gives a cured rubbery composition having a well-balanced combination of excellent oil resistance and excellent cold resistance.

Thus, according to this invention, there can be provided a curable composition composed of (1) a rubbery solid polymer or copolymer of a carboxylic acid glycidyl ester, said polymer or copolymer having a reduced viscosity, determined at 80° C. for its 0.1% monochlorobenzene solution, of at least 0.5, and the main chain of said polymer or copolymer consisting of a repeating unit of formula (I), repeating units of formulae (I) and (II) in which the (I)/(II) mole ratio is 50-99/50-1, repeating units of formulae (I), (II) and (III) in which the (I)/(II)/(III) mole ratio is 1-90/1-10/3-40, repeating units of formulae (I), (II) and (IV) in which the (I)/(II)/(IV) mole ratio is 35-90/1-20/not less than 5, repeating units of formulae (I) and (III) in which the (I)/(III) mole ratio is 50-97/50-3, repeating units of formulae (I), (III) and (IV) in which the (I)/(III)/(IV) mole ratio is 35-90/5-60/not less than 5, or repeating units of formulae (I), (II), (III) and (IV) in which the (I)/(II)/(III)/(IV) mole ratio is 35-85/3-10/3-55/not less than 5, provided that when the main chain has two or more repeating units, the total amount of the units is 100:

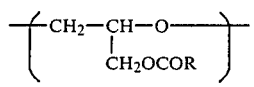 (I)

wherein R represents a saturated alkyl group having 1 to 4 carbon atoms,

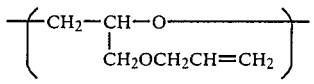 (II)

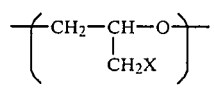 (III)

wherein X represents a halogen atom,

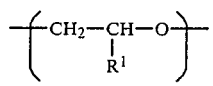 (IV)

wherein $R^1$ represents H or $CH_3$;
and (2) a curing amount of a curing agent.

The curable composition of the invention may comprise another natural or synthetic rubbery material in addition to the rubbery solid polymer or copolymer of a carboxylic acid glycidyl ester. Examples of the other rubbery material include natural rubber, isoprene rubber, butadiene rubber, styrene-butadiene rubber, ethylene-propylene-butadiene rubber, butyl rubber, halogenated butyl rubber, chlorine-containing acrylic ruber, chlorinated polyethylene rubber, fluorine rubber, chloroprene rubber, acrylonitrile-butadiene rubber, epichlorohydrin rubber, epichlorohydrin-ethylene oxide copolymer rubber, epichlorohydrin-allyl glycidyl ether copolymer rubber, epichlorohydrin-ethylene oxide-allyl glycidyl ether copolymer rubber and acrylic rubber containing unsaturated groups. The amount of the other rubbery material to be incorporated may be properly selected. For example, it is about 10 to about 300 parts by weight per 100 parts by weight of the rubbery solid polymer or copolymer of this invention.

The curable composition of this invention contains the curing agent which is properly selected depending upon, for example, the combination of the units of formulae (I) to (IV), the kind of the other rubbery material that may be used, etc. Examples of the curing agent include organic peroxides, sulfur, sulfur-donating compounds, accelerators of the sulfur compound type, combinations of these with various accelerators, mercaptotriazines, chemicals for resin cure, chemicals for oxime cure, polyamines, thioureas and polyphenols. Specific examples of the organic peroxides are dicumyl peroxide, cumene hydroperoxide, 2,5-dimethyl-2,5-di-(tert. butyl peroxy)hexane, di-tert. butyl peroxide and benzoyl peroxide. Specific examples of the sulfur-donating compounds are tetramethylthiuram disulfide and pentamethylene tetrasulfide. Specific examples of the sulfur compound-type accelerators are thizoles such as 2-mercaptobenzothiazole and dibnezothiazole, mercaptoimidazolines such as 2-cyclohexylbenzothiazyl sulfenamide, thiocarbamates such as dimethyl thiocarbamate and xantogenates such as zinc isopropyl xanthogenate. Examples of accelerators which may be used in combination with sulfur or the sulfur compounds include guanidines such as diphenylguanidine and amines such as hexamethylenetetramine. Dibutylamino-3,5-dimercaptotriazine is an example of the mercaptotriazines. Examples of the chemicals for resin cure are alkylphenol/formaldehyde resins, and p-quinonedioxime and p,p'-dibenzylquinonedioxime may be cited as examples of the chemicals for oxime cure. Specific examples of the polyamines are hexamethyenediamine carbamate. Specific examples of the thioureas are ethylenethiourea and dibutylthiourea. Specific examples of the mercaptotriazines include trimercaptotriazine and dibutylamino-3,5-triazine.

These curing agents can be used as required in combination with curing aids in accordance with techniques known in the art. The amounts of the curing agent and curing aid to be incorporated in the curable composition of this invention is, for example, 0.01 to 20% by weight, preferably 0.1 to 15% by weight, based on the weight of the rubber component. The amount may be properly selected depending upon the proportion of the rubber component, the kind of the curing agent, and the purpose for which the resulting cured article is used.

The composition of this invention may further contain various agents necessary for processing or for adjusting various practical properties, such as reinforcing agents, fillers, plasticizers, processing aids, stabilizers, antioxidants, pigments, fire retardants, etc. In producing and processing the composition of this invention, various processing means practiced in the art can be employed.

The cured articles obtained by curing the curable composition of this invention have excellent oil resistance to various oils and excellent cold resistance in a well-balanced combination, and further exhibit excellent heat resistance. They also exhibit excellent oil resistance to sour oils, and have reduced corrosive actions on metals.

The following examples illustrate the present invention more specifically.

EXAMPLE 1

Dibutyltin oxide (12.5 g) and 26.6 g of tributyl phosphate were put in a flask equipped with a thermometer and a distillation column, and with stirring, heated at 250° C. for 20 minutes. The reaction mixture was cooled to form a solid polymerization catalyst.

The inside of a 50 ml glass ampoule was purged with nitrogen, and the ampoule was charged with 82 mg of the resulting catalyst and 15.4 g of glycidyl acetate dehydrated to less than 10 ppm. The ampoule was then sealed, and with shaking, the monomer was polymerized at 30° C. for 20 hours. After the polymerization, the reaction mixture was immersed overnight in 200 ml of methanol containing 0.5% of 2,2'-methylenebis(4-methyl-6-tert.butyl phenol). Methanol was removed by decantation, and the polymerization product was again washed with 200 ml of methanol. It was further immersed in methanol and again washed similarly, and then dried at 60° C. under reduced pressure for 8 hours. The amount of the polyglycidyl acetate yielded was 14.5 g (yield 94%), and had a reduced viscosity, determined for its 0.1% monochlorobenzene solution at 80° C., of 1.30. The infrared absorption spectrum of this polymer is shown in FIG. 1.

EXAMPLE 2

Figure 2:
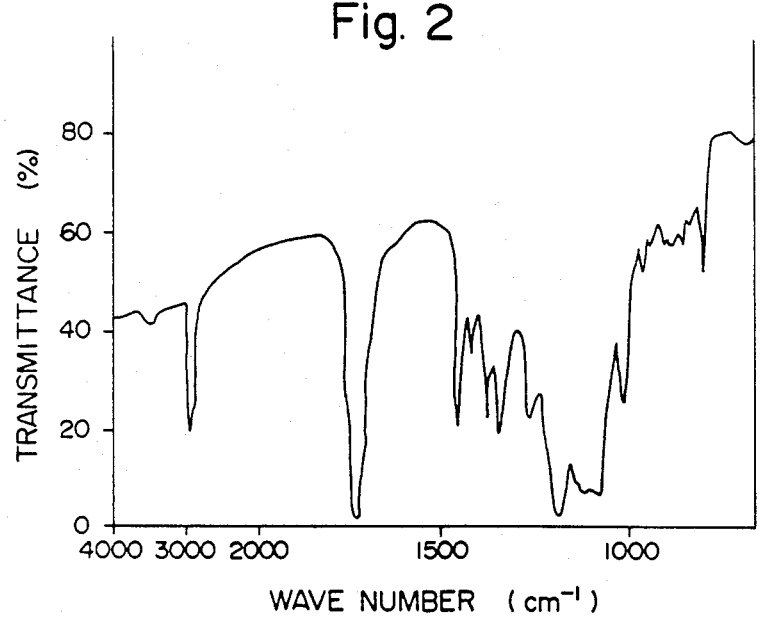

A solid polymerization catalyst was prepared in the same way as in Example 1 except that 16.2 g of tributyltin chloride was used instead of butyltin oxide. The same polymerization reaction as in Example 1 was carried out except that 50 mg of the resulting polymerization catalyst was used and 14.5 g of glycidyl propionate was used instead of glycidyl acetate. There was obtained 11.4 g (yield 79%) of polyglycidyl propionate having a reduced viscosity, determined for its 0.1% monochlorobenzene solution at 80° C., of 4.66. The infrared absorption spectrum of this polymer is shown in FIG. 2.

EXAMPLE 3

Figure 3:
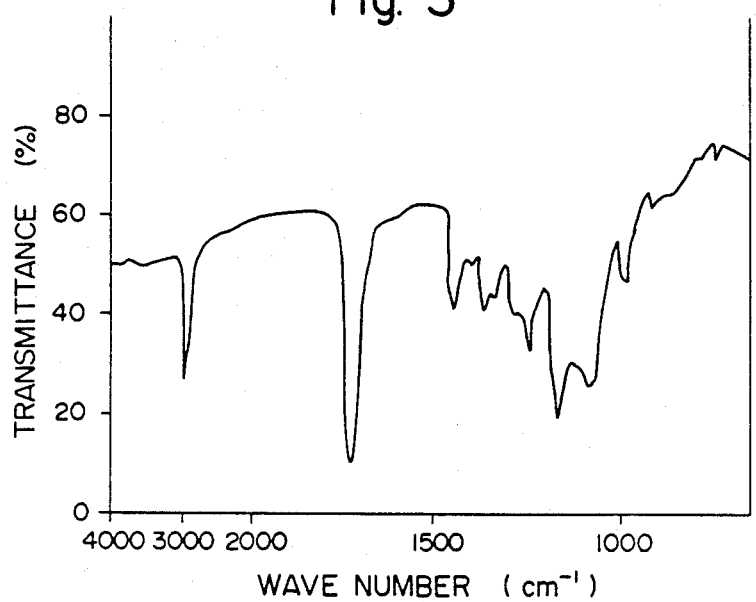

The same polymerization reaction as in Example 1 was carried out except that 50 mg of the same catalyst as in Example 1 was used and 14.2 g of glycidyl butyrate was used instead of glycidyl acetate. There was obtained 14 g (yield 98%) of polyglycidyl butyrate having a reduced viscosity, determined for its 0.1% monochlorobenzene solution at 80° C., of 2.35. The infrared absorption spectrum of this polymer is shown in FIG. 3.

EXAMPLE 4

Dibutyltin oxide (10.0 g) and 23.4 g of tributyl phosphate were put in a flask equipped with a thermometer and a distillation column, and with stirring, heated at 260° C. for 15 minutes. The reaction mixture was cooled to obtain a solid polymerization catalyst.

The inside of a 1-liter four-necked glass flask equipped with a stirrer, a thermometer, a sample introducing portion and a nitrogen introducing portion was purged with nitrogen, and the reactor was then charged with 2.3 g of the resulting catalyst, 680 g of hexane, 273 g of glycidyl acetate and 17 g of allyl glycidyl ether. With stirring, they were reacted at 30° C. for 18 hours. After the polymerization, hexane was removed by decantation, and 150 ml of methanol containing 0.5% of 2,2'-methylenebis(4-methyl-6-tert.butylphenol) was added to the polymerization porduct. The mixture was left to stand overnight. The polymerization product was further washed with two 150 ml. portions of methanol. This immersion and washing were repeated once more, and the product was dired at 60° C. under reduced pressure for 8 hours to give 276 g of a rubbery copolymer.

EXAMPLES 5-7

Copolymers of glycidyl propionate and allyl glycidyl ether and a copolymer of glycidyl butyrate and allyl glycidyl ether were prepared in the same way as in Example 4.

Table 1 summarizes the polymerization reaction conditions and the properties of the isolated copolymers for Examples 4 to 7.

By X-ray analysis of these copolymers, no peak showing crystals was observed.

TABLE 1

Figure 4:
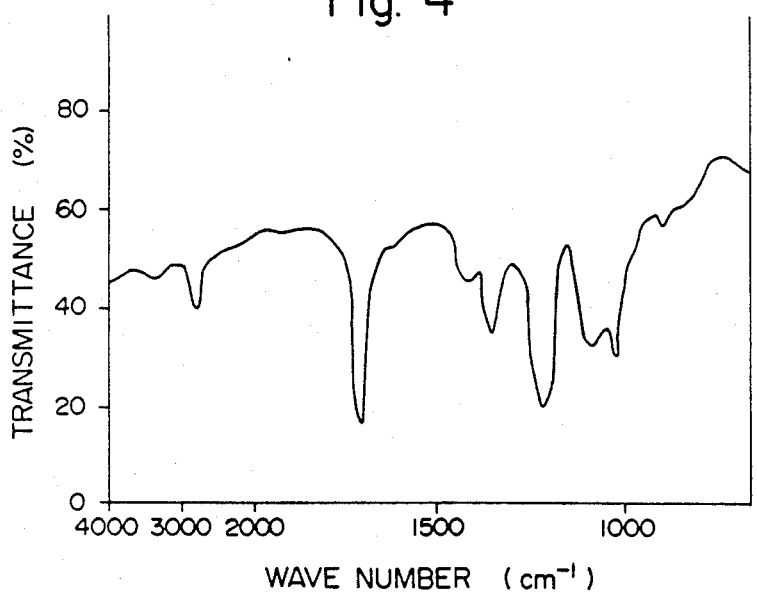
Figure 5:
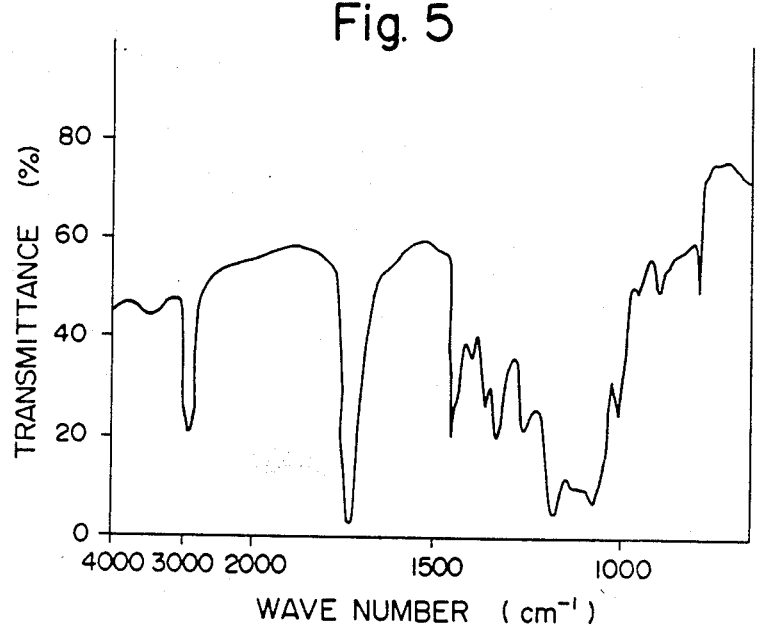
Figure 6:
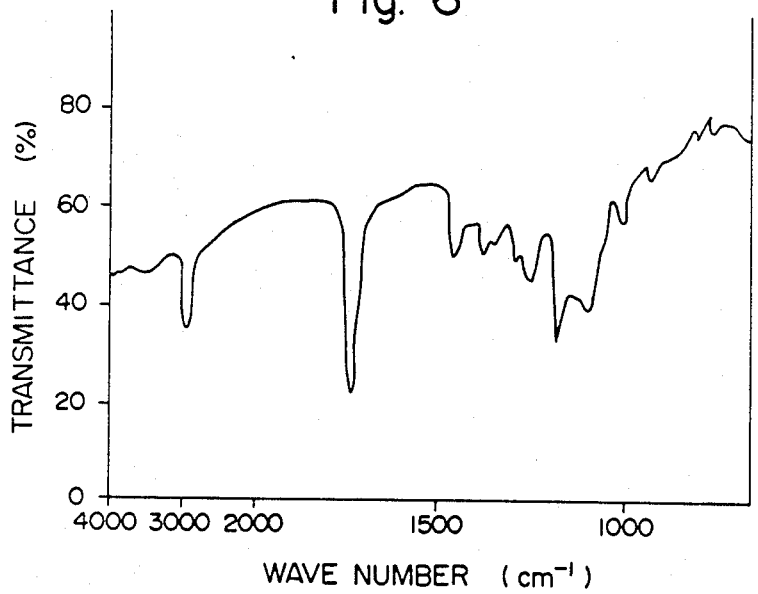

| Example | 4 | 5 | 6 | 7 |
|---|---|---|---|---|
| Monomers charged (mole %) | | | | |
| Glycidyl acetate | 94 | | | 80 |
| Glycidyl propionate | | 90 | | |
| Glycidyl butyrate | | | 95 | |
| Allyl glycidyl ether | 6 | 10 | 5 | 20 |
| Amount of the catalyst (g/mole of monomer) | 0.93 | 0.69 | 0.62 | 0.1 |
| Hexane/monomer ratio | 2.3 | 2.3 | 2.3 | 2.3 |
| Reaction temperature (°C.) | 30 | 27 | 30 | 30 |
| Reaction time (hours) | 18 | 15 | 20 | 25 |
| Copolymer isolated | | | | |
| Yield (%) | 95 | 93 | 97 | 80 |
| Reduced viscosity (*1) | 2.31 | 2.25 | 2.93 | 0.9 |
| Composition of the copolymer calculated for monomers (%) (*2) | | | | |
| Glycidyl acetate | 94.2 | | | |
| Glycidyl propionate | | 91.8 | | 83.0 |
| Glycidyl butyrate | | | 95.2 | |
| Allyl glycidyl ether | 5.8 | 8.2 | 4.8 | 17.0 |
| Infrared absorption spectrum | FIG. 4 | FIG. 5 | FIG. 6 | |

(*1) Determined at 80° C. for a 0.1% monochlorobenzene solution of the copolymer.
(*2) Obtained by determining the iodine value of the polymer and calculating the moles of allyl glycidyl ether.

EXAMPLE 8

One hundred parts (by weight; the same basis applies to parts appearing hereinafter) of each of the copolymers obtained in Examples 4 and 5 was roll-kneaded with 1 part of stearic acid, 40 parts of FEF carbon, 5 parts of zinc oxide, 1 part of nickel butylcarbamate, 1 part of dibenzothiazyl disulfide, 1 part of tetramethylthiuram monosulfide and 1 part of sulfur. The mixture was cured at 160° C. for 20 minutes. The properties of the cured product were measured. The results are shown in Table 2.

TABLE 2

| | Copolymer of Example | |
|---|---|---|
| Properties | 4 | 5 |
| Tensile strength (kg/cm$^2$) | 130 | 135 |
| Elongation (%) | 330 | 320 |
| Hardness (JIS A) | 68 | 67 |
| Oil resistance (fuel oil C) 40° C., 70 hours, ΔV % | +15.5 | +36.8 |
| Oil resistance (JIS #3 oil) 150° C., 70 hours, ΔV % | +0.5 | +2.1 |
| Cold resistance (Gehman test T$_{100}$) °C. | −32 | −43 |

EXAMPLE 9

Dibutyltin oxide (10.0 g) and 23.4 g of tributyl phosphate were put in a flask equipped with a thermometer and a distillation column. With stirring, the mixture was heated at 260° C. for 15 minutes. The reaction mixture was then cooled to form a solid polymerization catalyst.

The inside of a 20-liter stainless steel reactor equipped with a stirrer, a thermometer, a sample introducing portion and a nitrogen introducing portion was purged with nitrogen, and the reactor was charged successively with 500 g (4.31 moles) of glycidyl acetate, 31.4 g (0.275 mole) of allyl glycidyl ether, 6300 g of hexane and 70 g (1.60 moles) of ethylene oxide in this sequence. Then, 6.0 g of the resulting catalyst was added, and they were reacted at 24° C. for 6 hours with stirring. Water (100 g)

was added to the reaction mixture to stop the reaction. The solution phase of the reaction mixture was removed by decantation. The polymer was washed repeatedly with water and further with diethyl ether, and finally immersed overnight in 500 ml of diethyl ether containing 0.5 g of 2,2'-methyulenebis(4-methyl-6-tert.butylphenol). Diethyl ether was removed, and the residue was dried at 60° C. under reduced pressure for 24 hours to give 87 g of a rubbery polymer.

EXAMPLES 10–12

Copolymers composed of glycidyl acetate, glycidyl propionate or glycidyl butyrate as a first component, propylene oxide as a second component and allyl glycidyl ether as a third component were prepared in the same way as in Example 9.

Table 3 summarizes the polymerization reaction conditions and the properties of the isolated copolymers for Examples 9 to 12.

TABLE 3

| Example | 9 | 10 | 11 | 12 |
|---|---|---|---|---|
| Monomers charged (mole %) | | | | |
| Glycidyl acetate | 70 | 53 | | |
| Glycidyl propionate | | | 50 | |
| Glycidyl butyrate | | | | 51 |
| Ethylene oxide | 26 | | | |
| Propylene oxide (*1) | | 41 | 44 | 43 |
| Allyl glycidyl ether | 4.0 | 6.0 | 6.0 | 6.0 |
| Amount of the catalyst (g/mole of monomer) | 1.0 | 1.3 | 1.3 | 1.3 |
| Hexane/monomer ratio (g/g) | 10.5 | 8.3 | 8.3 | 8.3 |
| Reaction temperature (°C.) | 24 | 30 | 30 | 30 |
| Reaction time (hours) | 6 | 7 | 7 | 7 |
| Copolymer isolated | | | | |
| Yield (%) | 15 | 70 | 81 | 74 |
| Iodine value | 14.0 | 15.8 | 12.5 | 9.2 |
| Reduced viscosity (*2) | 2.7 | 2.9 | 2.3 | 1.8 |
| Composition of the copolymer calculated for monomers (%) (*3) | | | | |
| Glycidyl acetate | 60 | 60 | | |
| Glycidyl propionate | | | 57 | |
| Glycidyl butyrate | | | | 58 |
| Ethylene oxide | 35 | | | |
| Propylene oxide | | 34 | 38 | 38 |
| Allyl glycidyl ether | 5 | 6 | 5 | 4 |
| Infrared absorption spectrum | FIG. 7 | FIG. 8 | | |

(*1) Added in an amount of 47% of the total amount at the start of the reaction, in an amount of 38% after 4.5 hours and in an amount of 15% after 6 hours.
(*2) Determine at 80° C. for a 0.1% monochlorobenzene solution of the copolymer.
(*3) Determined from the iodine value, NMR spectrum or elemental analysis values (C and H) of the polymer.

EXAMPLE 13

One hundred parts of each of the copolymers obtained in Examples 9 and 10 were roll-kneaded with 1 part of stearic acid, 1.5 parts of dibenzothiazyl disulfide and 1 part of sulfur, and the mixture was cured at 160° C. for 20 minutes. The properties of the cured product were measured, and the results are shown in Table 4.

TABLE 4

| | Copolymer of Example | |
|---|---|---|
| Properties | 9 | 10 |
| Tensile strength (kg/cm²) | 123 | 133 |
| Elongation (%) | 450 | 440 |
| Hardness (JIS A) | 68 | 68 |
| Oil resistance (fuel oil C) 40° C., 70 hours, ΔV % | +18.8 | +36.5 |
| Oil resistance (JIS #3 oil) 150° C., 70 hours, ΔV % | +1.3 | +2.4 |
| Cold resistance (Gehman test | −42 | −41 |

TABLE 4-continued

| | Copolymer of Example | |
|---|---|---|
| Properties | 9 | 10 |
| $T_{100}$) °C. | | |

EXAMPLE 14

Dibutyltin oxide (10.0 g) and 23.4 g of tributyl phosphate were put in a flask equipped with a thermometer and a distillation column, and heated at 260° C. for 15 minutes with stirring. The reaction mixture was cooled to give a solid polymerization catalyst.

The inside of a 1-liter four-necked glass flask equipped with a stirrer, a thermometer, a sample introducing portion and a nitrogen introducing portion was purged with nitrogen. Then, the reactor was charged with 1.9 g of the resulting catalyst, 730 g of hexane, 174 g of glycidyl acetate and 138 g of epichlorohydrin and they were reacted at 35° C. for 26 hours with stirring. After the polymerization, hexane was removed by decantation, and 150 ml of methanol containing 0.5% of 2,2'-methylenebis(4-methyl-6-tert.butyl phenol) was added to the polymerization product. The mixture was left to stand overnight, and the polymer was further washed with two 150 ml portions of methanol. The above immersion and washing were repeated. The polymer was finally dried at 60° C. under reduced pressure for 8 hours to give 287 g of a rubbery polymer.

EXAMPLES 15–17

By the same method as in Example 14, copolymers of glycidyl propionate and epichlorohydrin and a copolymer of glycidyl butyrate and epichlorohydrin were obtained.

Table 5 summarizes the polymerization reaction conditions and the properties of the isolated copolymers for Examples 14 to 17.

TABLE 5

Figure 9:
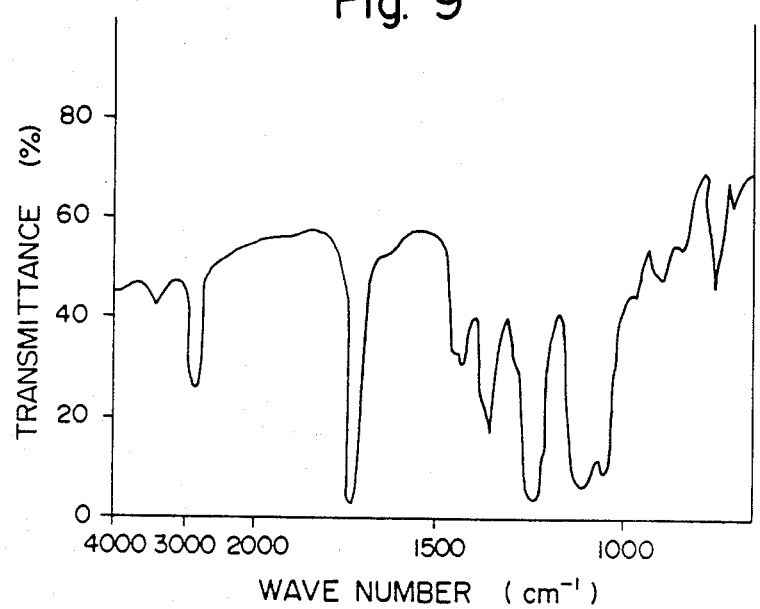
Figure 10:
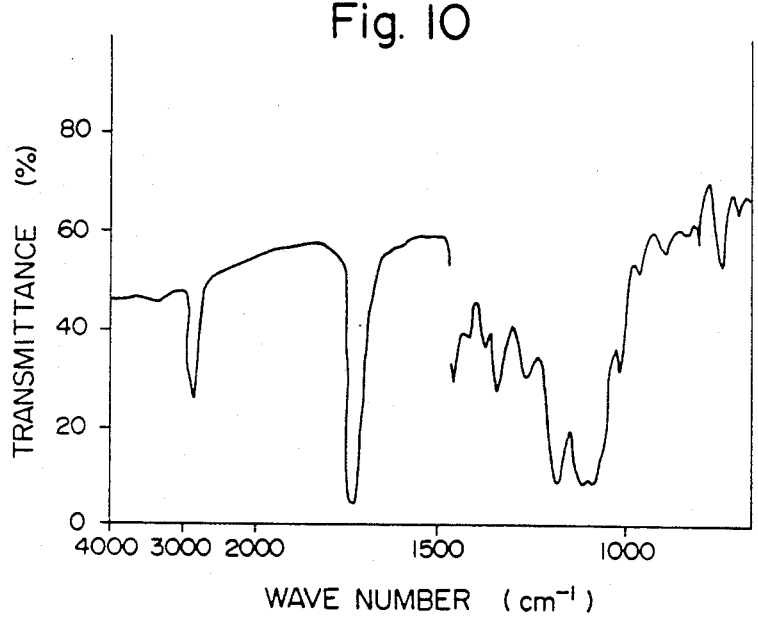

| Example | 14 | 15 | 16 | 17 |
|---|---|---|---|---|
| Monomers charged (mole %) | | | | |
| Glycidyl acetate | 50 | | | |
| Glycidyl propionate | | 50 | 30 | |
| Glycidyl butyrate | | | | 50 |
| Epichlorohydrin | 50 | 50 | 70 | 50 |
| Amount of the catalyst (g/mole of monomer) | 0.62 | 0.93 | 0.93 | 0.93 |
| Hexane/monomer ratio | 2.3 | 2.3 | 2.3 | 2.3 |
| Reaction temperature (°C.) | 35 | 30 | 30 | 22 |
| Reaction time (hours) | 26 | 10 | 20 | 72 |
| Copolymer isolated | | | | |
| Yield (%) | 92 | 98 | 97 | 95 |
| Reduced viscosity (*1) | 2.05 | 2.30 | 1.73 | 1.52 |
| Composition of the copolymer calculated for monomers (%) (*2) | | | | |
| Glycidyl acetate | 53.5 | | | |
| Glycidyl propionate | | 50.9 | 31.2 | |
| Glycidyl butyrate | | | | 51.3 |
| Epichlorohydrin | 46.5 | 49.1 | 68.8 | 48.7 |
| Infrared absorption spectrum | FIG. 9 | FIG. 10 | | FIG. 11 |

(*1) Determined at 80° C. for a 0.1% monochlorobenzene solution of the copolymer.
(*2) Obtained by determining chlorine in the polymer and calculating the moles of epichlorohydrin.

EXAMPLE 18

One hundred parts of each of the copolymers obtained in Examples 14 and 15 was roll-kneaded with 1 part of stearic acid, 40 parts of FEF carbon, 5 parts of red lead, 1 part of nickel butylcarbamate and 1.5 parts of 2-mercaptoimidazoline, and the mixture was cured at 160° C. for 30 minutes. The properties of the cured product were measured, and the results are shown in Table 6.

TABLE 6

| Properties | Copolymer of Example | |
|---|---|---|
| | 14 | 15 |
| Tensile strength (kg/cm$^2$) | 133 | 148 |
| Elongation (%) | 450 | 460 |
| Hardness (JIS A) | 72 | 72 |
| Oil resistance (fuel oil C) 40° C., hours, ΔV % | +24 | +49 |

EXAMPLE 19

Dibutyltin oxide (10.0 g) and 23.4 g of tributyl phosphate were put in a flask equipped with a thermometer and a distillation column, and with stirring, heated at 260° C. for 15 minutes. The reaction mixture was cooled to give a solid polymerization catalyst.

The inside of a 20-liter stainless steel reactor equipped with a stirrer, a thermometer, a sample introducing portion and a nitrogen introducing portion was purged with nitrogen, and the reactor was charged successively with 500 g (4.31 moles) of glycidyl acetate, 154 g (1.68 moles) of epichlorohydrin, 7100 g of hexane and 94 g (2.14 moles) of ethylene oxide in this order. Then, 6.0 g of the resulting polymerization catalyst was added, and they were reacted at 24° C. with stirring. Four hours and 6 hours, respectively, after the initiation of the reaction, ethylene oxide was further added in an amount of 47 g (1.07 moles) and 27 g (0.61 mole) respectively. The reaction as carried out for a total period of 8 hours. Water (100 g) was added to the reaction mixture to stop the reaction. The solution phase was removed by decantation. The polymerization product was repeatedly washed with water and further with diethyl ether. Finally, it was immersed overnight in 500 ml of ether containing 0.5 g of 2,2'-methylenebis(4-methyl-6-tert-.butyl phenol). Diethyl ether was removed by decantation, and the residue was dried at 60° C. under reduced pressure for 24 hours to give 715 g of a rubbery polymer.

EXAMPLES 20-22

By the same method as in Example 19, copolymers composed of glycidyl acetate or glycidyl propionate as a first component, ethylene oxide or propylene oxide as a second component and epichlorohydrin or epibromohydrin as a third component were prepared. Table 7 summarizes the polymerization reaction conditions and the properties of the isolated copolymers for Examples 19 to 22.

TABLE 7

| Example | 19 | 20 | 21 | 22 |
|---|---|---|---|---|
| Monomers charged (mole %) | | | | |
| Glycidyl acetate | 44 | 45 | 55 | |
| Glycidyl propionate | | | | 35 |
| Ethylene oxide | 39 | 44 | | 35 |
| Propylene oxide | | | 30 | |
| Epichlorohydrin | 17 | | 15 | 30 |
| Epibromohydrin | | 11 | | |
| Amount of the catalyst (g/mole of monomer) | 0.61 | 0.61 | 0.61 | 0.61 |
| Hexane/monomer ratio (g/g) | 8.3 | 8.3 | 8.3 | 8.3 |
| Reaction temperature (°C.) | 24 | 24 | 24 | 24 |
| Reaction time (hours) | 8 | 8 | 8 | 8 |

TABLE 7-continued

| Example | 19 | 20 | 21 | 22 |
|---|---|---|---|---|
| Copolymer isolated | | | | |
| Yield (%) | 87 | 75 | 81 | 69 |
| Elemental analysis (%) | | | | |
| Cl (or Br) | 5.86 | 8.67 | 4.16 | 7.91 |
| C | 50.28 | 48.50 | 51.94 | 52.29 |
| Reduced viscosity (*1) | 2.9 | 1.8 | 2.1 | 2.4 |
| Composition of the copolymer calculated for monomers (%) (*2) | | | | |
| Glycidyl acetate | 50 | 51 | 62 | |
| Glycidyl propionate | | | | 41 |
| Ethylene oxide (*3) | 36 | 39 | | 39 |
| Propylene oxide (*3) | | | 26 | |
| Epichlorohydrin | 14 | | 12 | 20 |
| Epibromohydrin | | 10 | | |

(*1) Determined at 80° C. for a 0.1% monochlorobenzene solution of the copolymer.
(*2) Calculated from the elemental analysis values.
(*3) Added in an amount of 56% of the total amount at the start of the reaction, and in an amount of 28% 4 hours later, and in an amount of 16% 6 hours later.

EXAMPLE 23

One hundred parts of each of the copolymers obtained in Examples 19 and 20 was roll-kneaded with 1 part of stearic acid, 40 parts of FEF carbon, 5 parts of red lead, 1 part of nickel dibutyldithiocarbamate and 1.2 parts of 2-mercaptoimidazoline. The mixture was cured at 160° C. for 20 minutes, and the properties of the cured product were measured. The results are shown in Table 8.

TABLE 8

| Properties | Copolymer of Example | |
|---|---|---|
| | 19 | 20 |
| Tensile strength (kg/cm$^2$) | 125 | 133 |
| Elongation (%) | 430 | 470 |
| Hardness (JIS A) | 69 | 68 |
| Oil resistance (fuel oil C) 40° C., 70 hours, ΔV % | +29.6 | +25.5 |
| Oil resistance (JIS #3 oil) 150° C., 70 hours, V % | +4.6 | +2.2 |
| Cold resistance (Gehman test $T_{100}$) °C. | −39 | −41 |

EXAMPLE 24

Dibutyltin oxide (10.0 g) and 23.4 g of tributyl phosphate were put in a flask equipped with a thermometer and a distillation column, and with stirring, heated at 280° C. for 15 minutes. The reaction mixture was then cooled to give a solid polymerization catalyst. The inside of a 20-liter stainless steel reactor equipped with a stirrer, a thermometer, a sample introducing portion and a nitrogen introducing portion was purged with nitrogen, and the reactor was charged successively with 500 g (4.31 moles) of glycidyl acetate, 154 g (1.67 moles) of epichlorohydrin, 131 g (0.8 mole) of allyl glycidyl ether, 5000 g of hexane and 94 g (2.14 moles) of ethylene oxide. Then, 6.0 g of the resulting polymerization catalyst was added, and they were reacted at 25° C. for 5 hours with stirring. Water (100 g) was added to the reaction mixture to stop the reaction. The solution phase was removed by decantation, and the polymerization product was repeatedly washed with hexane and further with diethyl ether. Finally, it was immersed overnight in 500 ml of diethyl ether containing 0.5 g of 2,2'-methyenebis(4-methyl-6-tert.butylphenol). Diethyl ether was removed by decantation, and the residue was dried at 60° C. under reduced pressure for 24 hours to give 560 g of a rubbery polymer. The polymer had a reduced viscosity, determined at 80° C. for its 0.1% monochlorobenzene solution, of 2.2. The composition of the polymer, calculated for the monomers, by the elemental analysis and proton nuclear magnetic resonance spectrum of the polymer was as follows:

| | |
|---|---|
| Glycidyl acetate | 40 mole % |
| Ethylene oxide | 33 mole % |
| Allyl glycidyl ether | 10 mole % |
| Epichlorohydrin | 17 mole % |

EXAMPLES 25-27

By the same method as in Example 24, copolymers composed of glycidyl acetate as a first component, ethylene oxide as a second component, allyl glycidyl ether as a third component and epichlorohydrin or epibromohydrin as a fourth component were prepared.

Table 9 summarizes the polymerization reaction conditions and the properties of the isolated copolymers for Examples 25-27.

TABLE 9

| Example | 25 | 26 | 27 |
|---|---|---|---|
| Monomers charged (mole %) | | | |
| Glycidyl acetate | 60 | 80 | 50 |
| Ethylene oxide | 20 | 10 | 35 |
| Allyl glycidyl ether | 5 | 5 | 5 |
| Epichlorohydrin | 15 | | |
| Epibromohydrin | | 5 | 10 |
| Amount of the catalyst (g/mole of monomer) | 0.61 | 0.61 | 0.61 |
| Hexane/monomer ratio (g/g) | 8 | 8 | 8 |
| Reaction temperature (°C.) | 25 | 25 | 25 |
| Reaction time (hours) | 6 | 6 | 6 |
| Copolymer isolated | | | |
| Yield (%) | 71 | 68 | 80 |
| Elemental analysis (%) Cl (or Br) | 5.2 | 2.7 | 4.5 |
| Reduced viscosity (*1) | 2.9 | 2.4 | 2.8 |
| Composition of the copolymer calculated for monomers (%) (*2) | | | |
| Glycidyl acetate | 57 | 78 | 48 |
| Ethylene oxide | 25 | 13 | 40 |
| Allyl glycidyl ether | 4 | 4 | 4 |
| Epichlorohydrin | 14 | | |
| Epibromohydrin | | 5 | 8 |

(*1) Determined at 80° C. for a 0.1% monochlorobenzene solution of the copolymer.
(*2) Calculated values by the elemental analysis and proton nuclear magnetic resonance spectrum of the copolymer.

EXAMPLE 28

One hundred parts of each of the copolymers obtained in Examples 25 to 27 was roll-kneaded with 1 part of stearic acid, 40 parts of FEF carbon, 5 parts of red lead, 1 part of nickel dibutyldithiocarbamate and 1.2 parts of 2-mercaptoimidazoline, and the mixture was cured at 160° C. for 20 minutes. The properties of the cured product are shown in Table 10.

In Table 10, the resistance to fuel oil C is represented by a percent change from the original properties of a test sample which was immersed in fuel oil C at 40° C. for 70 hours. The resistance to sour gasoline is represented by percent changes from the original properties of a test sample which was immersed in fuel oil B containing 2% by weight oif lauroyl peroxide at 40° C. for 120 hours, and then further in a fresh fuel oil B containing 2% by weight of lauroyl peroxide at 40° C. for 120 hours.

TABLE 10

| Properties | Example 25 | Example 26 | Example 27 |
|---|---|---|---|
| Original properties | | | |
| Tensile strength (kg/cm$^2$) | 131 | 138 | 135 |
| Elongation (%) | 435 | 410 | 470 |
| Hardness (JIS A) | 68 | 69 | 68 |
| Resistance to fuel oil C | | | |
| Percent change in volume (%) | +28.5 | +23.2 | +25.4 |
| Resistance to sour gasoline | | | |
| Percent change in tensile strength (%) | −50 | −44 | −65 |
| Percent change in elongation (%) | −65 | −68 | −48 |
| Change in hardness (point) | −17 | −15 | −18 |
| Percent change in volume (%) | +20.3 | +17.8 | +18.4 |
| Cold resistance test | | | |
| Gehman test T$_{100}$ (°C.) | −38 | −36 | −45 |

EXAMPLES 29-39 AND COMPARATIVE EXAMPLES 1-6

The ingredients indicated in Table 11 were kneaded on a 6-inch roll at a roll temperature of 60° C., and press-formed at 160° C. for 20 minutes. The properties of the resulting cured product were measured. The results are shown in Table 12.

TABLE 11

| | Example | | | | | | | | | | | Comparative Example | | | | | |
|---|---|---|---|---|---|---|---|---|---|---|---|---|---|---|---|---|---|
| | 29 | 30 | 31 | 32 | 33 | 34 | 35 | 36 | 37 | 38 | 39 | 1 | 2 | 3 | 4 | 5 | 6 |
| Copolymer composition (mole %) | | | | | | | | | | | | | | | | | |
| Glycidyl acetate | 96 | 90 | | | 48 | 96 | 96 | 50 | 50 | 70 | | | | | | | |
| Glycidyl propionate | | | 75 | 97 | 37.5 | | | | | | 40 | | | | | | |
| Allyl glycidyl ether | 4 | 10 | 25 | 3 | 14.5 | 4 | 4 | | | | | | | | | | |
| Epichlorohydrin | | | | | | | | 50 | 50 | 30 | 60 | | | | | | |
| Copolymer | 100 | 100 | 100 | 100 | 100 | 50 | 50 | 100 | 100 | 100 | 100 | | | | | | |
| Acrylonitrile-butadine copolymer (*1) | | | | | | 50 | | | | | | 100 | | | | | |
| Epichlorohydrin-ethylene oxide-allyl glycidyl ether copolymer (*2) | | | | | | | 50 | | | | | | 100 | | | | |
| Epichlorohydrin-ethylene oxide copolymer | | | | | | | | | | | | | | 100 | | | |
| Epichlorohydrin polymer | | | | | | | | | | | | | | | 100 | | |
| Acrylic rubber (*4) | | | | | | | | | | | | | | | | 100 | |
| Fluorine rubber (*5) | | | | | | | | | | | | | | | | | 100 |

TABLE 11-continued

| | Example | | | | | | | | | | | | Comparative Example | | | | | |
|---|---|---|---|---|---|---|---|---|---|---|---|---|---|---|---|---|---|---|
| | 29 | 30 | 31 | 32 | 33 | 34 | 35 | 36 | 37 | 38 | 39 | 1 | 2 | 3 | 4 | 5 | 6 |
| Stearic acid | 2 | 2 | 1 | 1 | 2 | 1 | 1 | 1 | 1 | 1 | 1 | 1 | 1 | 1 | 1 | 1 | 1 |
| FEF carbon (MT carbon) | 40 | 40 | 40 | 40 | 40 | 40 | 40 | 40 | 40 | 40 | 40 | 40 | 40 | 40 | 40 | 40 | (20) |
| ZnO | 5 | 5 | 5 | 5 | 5 | 5 | | | | | 5 | | | | | | |
| Pb$_3$O$_4$ | | | | | | | 5 | 5 | | 5 | 5 | | 5 | 5 | 5 | | |
| Ca(OH)$_2$, (CaCO$_3$) | | | | | | | | | (5) | | | | | | | | 6 |
| MgO | | | | | | | | | 3 | | | | | | | | 3 |
| Antioxidant (*6) | 1 | 1 | 1 | 1 | 1 | 1 | 1 | 1 | 0.2 | 1 | 1 | 1 | 1 | 1 | 1 | 2 | |
| Accelerator (*7) | 2 | 1.8 | 2.5 | | 2 | 2 | | 1.5 | | 1.5 | 1.5 | 1.5 | 1.5 | 1.2 | 1.2 | 1.5 | |
| Trithiocyanuric acid | | | | | | | | | 1 | | | | | | | | |
| Dicumyl proxide | | | | 2 | | | 2 | | | | | | | | | | |
| Sulfur | 1 | 0.8 | 1.5 | | 1 | 1 | | | | | | 1.5 | | | | | |

Note to Table 11
(*1): NBR, JSR, N230s (tradenames for a product of Japan Synthetic Rubber Co., Ltd.).
(*2): Epichlomer CG (tradename for a product of Osaka Soda Co., Ltd.).
(*3): Epichlomer C (tradename for a product of Osaka Soda Co., Ltd.).
(*4): Toaacron AR 740 (tradename for a product of Toa Paint Co., Ltd.).
(*5): Daiel G 701 (containing a vulcanizer) (tradename for a product of Daikin Kogyo Kabushiki Kaisha).
(*6): Nickel dibutylcarbamate (Examples 29, 31, 33 and 35 and Comparative Examples 1, 3 and 4); 2,2,4-trimetyl-1,2,-dihydroquinoline polymer (Examples 32 and 34 and Comparative Example 2).
(*7): Dibenzothiazyl disulfide (Examples 29-31, 33 and 35 and Comparative Example 1); tetramethylthiuram sulfide (Examples 29-31, 33 and 35); zinc dimethyldithiocarbamate (Comparative Example 5); iron dimethyldithiocarbamate (Comparative Example 5); 2-mercaptoimidazoline (Examples 36, 38 and 39 and Comparative Examples 2 to 4).

TABLE 12

| Properties | Example | | | | | | | | | | |
|---|---|---|---|---|---|---|---|---|---|---|---|
| | 29 | 30 | 31 | 32 | 33 | 34 | 35 | 36 | 37 | 38 | 39 |
| Properties in a normal condition | | | | | | | | | | | |
| Tensile strength (kg/cm$^3$) | 124 | 115 | 122 | 133 | 123 | 165 | 138 | 123 | 105 | 110 | 134 |
| Elongation | 350 | 310 | 340 | 330 | 340 | 380 | 330 | 360 | 310 | 380 | 350 |
| Hardness | 68 | 69 | 66 | 67 | 66 | 66 | 68 | 68 | 69 | 69 | 68 |
| Oil resistance test (% volume change) | | | | | | | | | | | |
| Fuel oil B (40°C. × 70 h) (*1) | +8.8 | +9.3 | +19.5 | +22.1 | +15.0 | +14.4 | +16.1 | +13.0 | +14.5 | +9.5 | +23.1 |
| Fuel oil C (40°C. × 70 h) (*2) | +15.5 | +17.0 | +36.8 | +40.3 | +28.6 | +35.4 | +33.3 | +23.9 | +24.0 | +16.8 | +46.6 |
| Sour oil (40°C. × 240 h) (*3) | +12.5 | +13.2 | +23.3 | +28.9 | +20.7 | +16.0 | +19.5 | — | — | — | — |
| Lubricant oil (150° C. × 70 h) (*4) | +0.5 | +1.3 | +2.1 | +2.4 | +1.1 | +9.6 | +4.5 | +2.3 | +2.5 | +1.2 | +3.4 |
| Engine oil (150° C. × 168 h) (*5) | +0.1 | +0.2 | +0.2 | +0.2 | +0.1 | +2.1 | +1.2 | — | — | — | — |
| Cold resistance test (Gehman torsion test) | | | | | | | | | | | |
| T$_{100}$ (°C.) | −32 | −38 | −43 | −44 | −37 | −37 | −30 | −34 | −33 | −36 | −36 |
| Heat resistance test (150° C. × 138 h, air oxidation) | | | | | | | | | | | |
| Change in tensile strength (%) | +3 | +2 | −3 | −5 | −2 | −40 | −5 | +8 | +2 | +3 | −1 |
| Change in elongation (%) | −45 | −55 | −45 | −43 | −47 | −82 | −58 | −40 | −35 | −37 | −35 |
| Change in hardness | +8 | +10 | +7 | +7 | +8 | +12 | +9 | +4 | +5 | +3 | +3 |

| Properties | Comparative Example | | | | | |
|---|---|---|---|---|---|---|
| | 1 | 2 | 3 | 4 | 5 | 6 |
| Properties in a normal condition | | | | | | |
| Tensile strength (kg/cm$^3$) | 240 | 160 | 143 | 156 | 125 | 138 |
| Elongation | 450 | 560 | 460 | 445 | 310 | 210 |
| Hardness | 68 | 66 | 70 | 73 | 66 | 70 |
| Oil resistance test (% volume change) | | | | | | |
| Fuel oil B (40° C. × 70 h) (*1) | +27.4 | +25.8 | +21.0 | +20.5 | +68.5 | +1.7 |
| Fuel oil C (40° C. × 70 h) (*2) | +53.5 | +51.6 | +41.2 | +38.4 | >100 | +3.5 |
| Sour oil (40° C. × 240 h) (*3) | Became brittle | +30.3 | Softened | Softened | +69.7 | +2.5 |
| Lubricant oil (150° C. × 70 h) (*4) | +21.8 | +18.0 | +16.1 | +13.9 | +16.0 | +1.8 |
| Engine oil (150° C. × 168 h) (*5) | Became brittle | Became brittle | Became brittle | Became brittle | +2.3 | +0.5 |
| Cold resistance test (Gehman torsion test) | | | | | | |
| T$_{100}$ (°C.) | −26 | −56 | −48 | −27 | −25 | −17 |
| Heat resistance test (150° C. × 138 h, air oxidation) | | | | | | |
| Change in tensile strength (%) | Became brittle | −8 | −19 | −6 | ±0 | ±0 |
| Change in elongation (%) | Became | −63 | −54 | −40 | ±0 | ±0 |

TABLE 12-continued

| | | | | | | |
|---|---|---|---|---|---|---|
| Change in hardness | brittle Became brittle | +9 | +3 | +9 | ±0 | ±0 |

Note to Table 12
(*1): Isooctane/toluene = 70/30 vol %
(*2): Isooctane/toluene = 50/50 vol %
(*3): The sour oil was a fuel oil containing 2% by weight of lauroyl peroxide. The test sample was immersed in this oil at 40° C. for 120 hours. The oil was then exchanged with a fresh one, and the sample was further immersed in it at 40° C. for 120 hours.
(*4): JIS #3 oil
(*5): Nissan Motor Oil 10W-30

The above test results demonstrate that the cured compositions in accordance with this invention have better oil resistance than NBR (Comparative Example 1), epichlorohydrin-ethylene oxide-allyl glycidyl ether copolymer rubber (Comparative Example 2), epichlorohydrin-ethylene oxide copolymer rubber (Comparative Example 3), epichlorohydrin rubber (Comparative Example 4) and nitrile rubber (Comparative Example 5), and the oil resistance is in good balance with cold resistance and heat resistance. The fluorine rubber (Comparative Example 6) has inferior cold resistance although its other properties are superior. A comparison of Examples 34 and 35 with Comparative Examples 1 and 2 shows that when the product of this invention is mixed with nitrile rubber or epichlorohydrin rubber, the oil resistances of these rubbers will be improved.

Corrosion test

Each of the cured products obtained in Examples 29, 36, 37, 38 and 39 and Comparative Examples 3 and 4 was sandwiched between two metallic plates, and left to stand for 120 hours in an atmosphere kept at a relative humidity of 100% and a temperature of 50° C. Then, the cured product was taken out, and the degree of corrosion of the metallic plates was rated on a scale of the following classes. The results are shown in Table 3. The steel plates used were JIS G314 (SPCC) and the aluminum plates used were JIS H4000 (A 505 2p).

TABLE 13

| Degree of corrosion (class) | State of corrosion |
|---|---|
| 1 | No corrosion |
| 2 | Very slight corrosion |
| 3 | Slight corrosion |
| 4 | Marked corrosion on half of the surface |
| 5 | Very heavy corrosion on the entire surface |

| | (Class) | | | | | | |
|---|---|---|---|---|---|---|---|
| | Example | | | | | Comparative Example | |
| | 29 | 36 | 37 | 38 | 39 | 3 | 4 |
| Steel plate | 2 | 3 | 2 | 2 | 3 | 4 | 4 |
| Aluminum plate | 1 | 1 | 1 | 1 | 2 | 3 | 3 |

The cured compositions of this invention are markedly improved in resistance to metal corroding tendency over epichlorohydrin-type rubbers.

EXAMPLES 40-52

Examples 29 to 39 were repeated except that the compounding recipes shown in Table 14 were used. The results are shown in Table 15.

TABLE 14

| | Example | | | | | | | | | | | | |
|---|---|---|---|---|---|---|---|---|---|---|---|---|---|
| | 40 | 41 | 42 | 43 | 44 | 45 | 46 | 47 | 48 | 49 | 50 | 51 | 52 |
| Copolymer composition (mole %) | | | | | | | | | | | | | |
| Glycidyl acetate | 95 | 95 | 60 | 50 | 60 | 60 | 85 | 50 | 50 | 57 | 50 | 50 | 50 |
| Allyl glycidyl ether | 5 | 5 | 5 | 6 | 5 | 5 | | | | | 3 | 3 | 3 |
| Ethylene oxide | | | 35 | 44 | | | | 35 | 40 | 40 | 37 | 37 | 32 |
| Propylene oxide | | | | | 35 | 35 | | | | | | | |
| Epichlorohydrin | | | | | | | 15 | 15 | | | 10 | 10 | |
| Epibromohydrin | | | | | | | | | 10 | 3 | | | 5 |
| Copolymer | 100 | 100 | 100 | 100 | 100 | 100 | 100 | 100 | 100 | 100 | 100 | 100 | 100 |
| Stearic acid | 1 | 1 | 1 | 1 | 1 | 1 | 1 | 1 | 1 | 1 | 1 | 1 | 1 |
| FEF carbon | 40 | | 40 | 40 | 40 | 20 | 40 | 40 | 40 | 40 | 40 | 40 | 40 |
| Silica | | 20 | | | | 15 | | | | | | | |
| CaCO$_3$ | | | | | | | 5 | | | | 5 | | |
| MgO | | | | | | | 3 | | | | 3 | | |
| Pb$_3$O$_4$ | | | | | | | | 5 | 5 | 5 | | 5 | 5 |
| ZnO | 5 | 5 | 5 | 5 | 5 | 5 | | | | | | | |
| Nickel dibutyldithio-carbamate (antioxidant) | 1 | 1 | 1 | 1 | 1 | 1 | 1 | 1 | 1 | 1 | 1 | 1 | 1 |
| Accelerator (*) | 1 | 2 | 1.5 | 1.5 | 1.5 | 2 | 0.5 | 1.2 | 1.2 | 1.2 | | 1.2 | 1.2 |
| Sulfur | | 1 | 1 | 1 | 1 | 1 | | | | | | | |
| Trithiocyanuric acid | | | | | | | 1.2 | | | | 1.2 | | |
| Dipentamethylene thiuram hexasulfide (TRA) | 3 | | | | | | | | | | | | |
| Monoethanolamine | | 0.5 | | | | | | | | | | | |

(*)Tetramethylthiuram disulfide (Example 40); dibenzothiazyl disulfide (Examples 41–45); diphenylguanidine (Example 46); 2-mercaptoimidazoline (Examples 47–49 and 51–52).

TABLE 15

| | Example | | | | | | | | | | | | |
|---|---|---|---|---|---|---|---|---|---|---|---|---|---|
| | 40 | 41 | 42 | 43 | 44 | 45 | 46 | 47 | 48 | 49 | 50 | 51 | 52 |
| Properties in a normal condition | | | | | | | | | | | | | |
| Tensile strength (kg/cm³) | 117 | 128 | 123 | 120 | 133 | 128 | 108 | 125 | 133 | 130 | 115 | 128 | 135 |
| Elongation | 370 | 540 | 450 | 470 | 440 | 480 | 470 | 430 | 470 | 475 | 400 | 450 | 480 |
| Hardness | 67 | 68 | 68 | 67 | 68 | 67 | 70 | 69 | 68 | 68 | 69 | 68 | 68 |
| Oil resistance test (% volume change) | | | | | | | | | | | | | |
| Fuel oil B (40° C. × 70 h) (*1) | +9.6 | +9.8 | +10.7 | +11.0 | +19.8 | +20.3 | +11.7 | +16.3 | +13.3 | 13.0 | +14.0 | +13.8 | +15.5 |
| Fuel oil C (40° C. × 70 h) (*2) | +17.7 | +20.1 | +18.8 | +19.5 | +36.5 | +37.7 | +22.3 | +29.6 | +25.5 | +24.5 | +29.7 | +28.5 | +24.9 |
| Sour oil (40° C. × 240 h) (*3) | +17.2 | +13.5 | +22.4 | +25.4 | +28.5 | +27.6 | +15.1 | +22.0 | +18.8 | +18.5 | +18.0 | +17.0 | +18.0 |
| Lubricant oil (150° C. × 70 h) (*4) | +0.8 | 0.7 | +1.3 | +2.3 | +2.4 | +2.9 | °1.5 | +4.6 | +2.2 | +2.5 | +3.6 | +3.5 | +1.5 |
| Engine oil (150° C. × 168 h) (*5) | +0.5 | +0.4 | +2.2 | +0.9 | +1.2 | +1.2 | +1.0 | +2.0 | +1.9 | +1.8 | +2.0 | +2.0 | +1.8 |
| Cold resistance test (Gehman torsion test) | | | | | | | | | | | | | |
| T₁₀₀ (°C.) | −34 | −36 | −42 | −55 | −41 | −43 | −30 | −39 | −41 | −41 | −40 | −41 | −42 |
| Heat resistance test (150° C. × 138 h, air oxidation) | | | | | | | | | | | | | |
| Change in tensile strengths (%) | +6 | +5 | +1 | −2 | +3 | +2 | +5 | +3 | +2 | +2 | +4 | +3 | +2 |
| Change in elongation (%) | −47 | −52 | −49 | −45 | −44 | −40 | −45 | −50 | −46 | −45 | −50 | −48 | −45 |
| Change in hardness | +8 | +11 | +6 | +3 | +4 | +3 | +6 | +3 | +3 | +3 | +6 | +6 | +5 |

(*1) to (*5) are the same as in Table 12.

What is claimed is:

1. A rubbery solid polymer or copolymer of a carboxylic acid glycidyl ester, said polymer or copolymer having a reduced viscosity, determined at 80° C. for its 0.1% monochlorobenzene solution, of at least 0.5, and the main chain of said polymer or copolymer consisting of a repeating unit of formula (I), repeating units of formulae (I) and (II) in which the (I)/(II) mole ratio is 50-99/50-1, repeating units of formulae (I), (II) and (III) in which the (I)/(II)/(III) mole ratio is 1-90/1-10/3-40, repeating units of formulae (I), (II) and (IV) in which the (I)/(II)/(IV) mole ratio is 35-90/1-20/not less than 5, repeating units of formulae (I) and (III) in which the (I)/(III) mole ratio is 50-97/50-3, repeating units of formulae (I), (III) and (IV) in which the (I)/(III)/(IV) mole ratio is 35-90/5-60/not less than 5, or repeating units of formulae (I), (II), (III) and (IV) in which the (I)/(II)/(III)/(IV) mole ratio is 35-85/3-10/3-55/not less than 5, provided that when the main chain has two or more repeating units, the total amount of the units is 100:

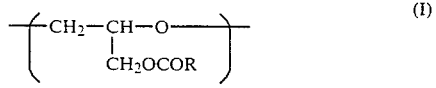

(I)

wherein R represents a saturated alkyl group having 1 to 4 carbon atoms,

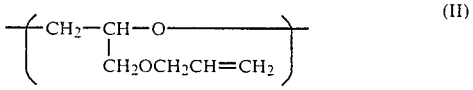

(II)

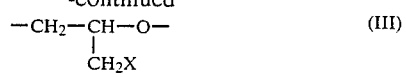

(III)

wherein X represents a halogen atom,

(IV)

wherein R¹ represents H or CH₃.

2. A curable composition composed of the rubbery solid polymer or copolymer of a carboxylic acid glycidyl ester as set forth in claim 1 and a curing agent.

3. The rubbery solid polymer or copolymer of claim 1 having a reduced viscosity, determined at 80° C., for its 0.1% monochlorobenzene solution of 1.0 to 4.0.

4. The rubbery solid polymer or copolymer of claim 1 wherein the main chain of said polymer or copolymer consists of repeating units of formula (I).

5. The rubbery solid polymer or copolymer of claim 1 wherein the main chain of said polymer or copolymer consists of repeating units of formulae (I) and (II).

6. The rubbery solid polymer or copolymer of claim 1 wherein the main chain of said polymer or copolymer consists of repeating units of formulae (I), (II), and (III).

7. The rubbery solid polymer or copolymer of claim 1 wherein the main chain of said polymer or copolymer consists of repeating units of formulae (I), (II), and (IV).

8. The rubbery solid polymer or copolymer of claim 1 wherein the main chain of said polymer or copolymer consists of repeating units of formulae (I) and (III).

9. The rubbery solid polymer or copolymer of claim 1 wherein the main chain of said polymer or copolymer consists of repeating units of formulae (I), (III), and (IV).

10. The rubbery solid polymer or copolymer of claim 1 wherein the main chain of said polymer or copolymer consists of repeating units of formulae (I), (II), (III), and (IV).

UNITED STATES PATENT AND TRADEMARK OFFICE
CERTIFICATE OF CORRECTION

PATENT NO. : 4,530,994
DATED : July 23, 1985
INVENTOR(S) : SHIMIZU ET AL.

It is certified that error appears in the above-identified patent and that said Letters Patent is hereby corrected as shown below:

ON THE TITLE PAGE

Assignee: delete "Suda", insert --Soda--.

Signed and Sealed this

First Day of October 1985

[SEAL]

Attest:

DONALD J. QUIGG

Attesting Officer

Commissioner of Patents and
Trademarks—Designate